United States Patent [19]

Kaplan et al.

[11] Patent Number: 5,488,719

[45] Date of Patent: Jan. 30, 1996

[54] SYSTEM FOR CATEGORIZING CHARACTER STRINGS USING ACCEPTABILITY AND CATEGORY INFORMATION CONTAINED IN ENDING SUBSTRINGS

[75] Inventors: Ronald M. Kaplan, Palo Alto, Calif.; Robert Shuchatowitz, Brighton, Mass.; Atty T. Mullins, Tucson, Ariz.

[73] Assignee: Xerox Corporation, Stamford, Conn.

[21] Appl. No.: 814,552

[22] Filed: Dec. 30, 1991

[51] Int. Cl.$^6$ ..................................................... G06F 17/30
[52] U.S. Cl. ........................ 395/600; 382/177; 382/182; 382/224; 364/419.07
[58] Field of Search .......................... 364/419; 395/600, 395/100, 144; 382/171, 182, 224

[56] References Cited

U.S. PATENT DOCUMENTS

| | | | |
|---|---|---|---|
| 4,003,022 | 1/1977 | Takahashi et al. | 382/226 |
| 4,034,343 | 7/1977 | Wilmer | 340/146.3 |
| 4,750,122 | 6/1988 | Kaji et al. | 364/419 |
| 4,777,600 | 10/1988 | Saito et al. | 364/419.02 |
| 4,947,438 | 8/1990 | Paeseler | 381/43 |
| 4,985,863 | 1/1991 | Fujisawa et al. | 364/900 |
| 4,989,258 | 1/1991 | Takahashi et al. | 382/37 |
| 5,003,614 | 3/1991 | Tanaka et al. | 382/18 |
| 5,079,701 | 1/1992 | Kuga et al. | 364/419.11 |
| 5,083,268 | 1/1992 | Hemphill et al. | 395/12 |
| 5,140,644 | 8/1992 | Kawaguchi et al. | 382/226 |
| 5,265,171 | 11/1993 | Sangu | 382/177 |
| 5,450,598 | 9/1995 | Kaplan et al. | 395/800 |

FOREIGN PATENT DOCUMENTS

| | | | |
|---|---|---|---|
| 0282721 | 9/1988 | European Pat. Off. | G06F 15/38 |
| 425291A2 | 10/1990 | European Pat. Off. | |
| 8301329 | 4/1983 | WIPO | G06F 15/40 |

OTHER PUBLICATIONS

Sinha, R. M. K. and Prasada, B., "Visual Text Recognition Through Contextual Processing", *Pattern Recognition*, vol. 21, No. 5, 1988, pp. 463–479.

Srihari, S. N., Hull, J. J., and Choudhari, R., "Integrating Diverse Knowledge Sources in Text Recognition," *ACM Transactions on Office Information Systems*, vol. 1, No. 1, Jan. 1983, pp. 68–87.

Goshtasby, A., and Ehrich, R. W., "Contextual Word Recognition Using Probabilistic Relaxation Labeling," *Pattern Recognition*, vol. 21, No. 5, 1988, pp. 455–462.

(List continued on next page.)

*Primary Examiner*—Thomas G. Black
*Assistant Examiner*—P. Wang

[57] ABSTRACT

A data storage medium stores string data that can be used in character recognition and instructions for accessing the string data. The string data includes data units that can be accessed by a processor in executing the instructions. The processor can use character data indicating characters of a string to access a sequence of the data units that ends with an ending subsequence. The ending subsequence includes acceptance information indicating whether a string whose sequence of data units ends with the ending subsequence is an acceptable string. If so, the ending subsequence also includes category set information indicating a set of categories for strings whose sequences end with the ending subsequence. The categories can include words, numbers, compound words, and so forth. The acceptance information can include a bit in a character label data unit that includes information indicating the character type of an ending character. The acceptance information can also include an acceptance data unit whose value indicates an acceptable string ending. The acceptance data unit can be followed by category data units, each with a value indicating a category. The category data units can be used to obtain a bit vector for a string, each bit of which indicates whether the string is in one of the categories. For compactness, all or part of an ending subsequence can be shared by plural acceptable strings. Looping can be used to represent a category with a potentially infinite number of strings, such as numbers.

23 Claims, 9 Drawing Sheets

OTHER PUBLICATIONS

Hull, J. J., Srihari, S. N., and Choudhari, R., "An Integrated Algorithm for Text Recognition: Comparison with a Cascaded Algorithm," *IEEE Transactions on Pattern Analysis and Machine Intelligence*, vol. PAMI–5, No. 4, Jul. 1983, pp. 384–395.

Bozinovic, R., and Srihasri, S. N., "Knowledge–based Cursive Script Interpreation," *Proceedings of Seventh International Conference on Pattern Recognition*, Montreal, Canada, Jul. 30–Aug. 2, 1984, vol. 2, pp. 774–776.

Appel, A. W., and Jacobson, G. J., "The World's Fastest Scrabble Program," *Communications of the ACM*, vol. 31, No. 5, May 1988, pp. 572–578.

Supplementary European Search Report and Annex, Application No. EP 93 90 6168.

SYSTEM FOR CATEGORIZING CHARACTER STRINGS USING ACCEPTABILITY AND CATEGORY INFORMATION CONTAINED IN ENDING SUBSTRINGS

BACKGROUND OF THE INVENTION

The present invention relates to character recognition techniques that categorize strings, such as strings of characters or other elements.

Some conventional character recognition techniques improve recognition accuracy by taking into account different categories of character strings that can occur in text. The character recognition products of Xerox Imaging Systems, for example, employ several specialized recognition algorithms, each for a respective category of character string. One algorithm can look up words in a dictionary, another can recognize valid strings of arabic numerals with punctuation marks, and so forth. If a string of character candidates includes a candidate that has a substantial probability for more than one character category, the ambiguity can be resolved by applying each recognition algorithm to the possible string that would result from each probable character category. If one of the possible strings is recognized by one of the algorithms, the recognition result can be used to resolve the ambiguity. If two or more possible strings are recognized by different algorithms, the sequence of categories of strings can be taken into account to resolve the ambiguity.

Takahashi et al., U.S. Pat. No. 4,003,022, describe string pattern recognition techniques. As shown and described in relation to FIGS. 1–4 and 7, a character is decomposed into a symbolic string pattern that is fed to sequential logic. Col. 3 lines 52–55 state that the class for each symbol string pattern is determined by comparing it with all sequential logics and checking which has accepted the pattern.

Sinha, R. M. K. and Prasada, B., "Visual Text Recognition through Contextual Processing," *Pattern Recognition*, Vol. 21, No. 5, 1988, pp. 463–479, describe visual text recognition techniques. Dictionary methods are described beginning in the last paragraph on page 463. Section 2.1 on page 465 describes a partial dictionary. Section 2.6 on page 467 describes word boundary identification based on unambiguous punctuation marks. Section 2.7 on pages 467–468 describes heuristics use to identify word boundaries, match with the dictionary, and traverse through a modified Viterbi net. Section 3 on page 468 and FIGS. 3 and 4 describe dictionary organization and search, and relate specifically to a trie structure based dictionary. FIG. 3 shows a node structure, including a NEXT field, an ALT field, a character, an end of word mark, and a flag. Page 473, right hand column, notes that errors are encountered due to several causes, including ambiguous punctuation marks within a word and mapping of numbers to a dictionary word.

Srihari, S. N., Hull, J. J., and Choudhari, R., "Integrating Diverse Knowledge Sources in Text Recognition," *ACM Transactions on Office Information Systems*, Vol. 1, No. 1, January 1983, pp. 68–87, describe text recognition techniques. Section 3 on pages 72–74 and FIG. 2 describe lexical organization, relating specifically to a letter trie. FIG. 2(a) shows the fields of a node, including: a token, CHAR; a word-length indicator array of bits, WL; an end-of-word tag bit, E; and two pointers labeled NEXT and ALTERNATE.

SUMMARY OF THE INVENTION

One aspect of the invention deals with basic problems in conventional character recognition techniques that take character string category into account. As described above, some conventional techniques handle each character string category with a separate algorithm. This approach is time inefficient because each category's algorithm must be performed for each string of character candidates. Also, this approach is space inefficient because the data necessary to perform each category's algorithm, including instructions, must be stored separately.

This aspect is further based on the discovery of a technique that alleviates these basic problems. The technique integrates the algorithms for all categories of strings so that only one algorithm is performed for each string of character candidates. The technique also integrates the data for each category of string, so that the data used by the integrated algorithm is very compact.

This discovery is based on the observation that directed graph techniques, and specifically directed graphs that represent finite state machines, make it possible to integrate diverse string recognition algorithms. The acceptable categories of strings vary significantly, but each category can be expressed as a respective finite state machine (FSM). Even categories that include infinitely many possible strings, such as the arabic numbers, can be expressed as cyclic FSMs. Therefore, the same lookup algorithm could be used with a directed graph representing each category's FSM. To realize space efficiency, the FSMs of all the categories can be composed into a combined FSM, so that only one directed graph is necessary to represent the combined FSM. To realize time efficiency, the lookup algorithm is only executed once in recognizing a string of character candidates. To resolve a string that is acceptable as more than one of the categories, the directed graph includes data indicating one or more categories for each acceptable string.

String data according to the invention thus includes a sequence of data units that can be accessed using data indicating characters of a string. If the string is acceptable, the sequence of data units ends with a subsequence that includes information indicating that the string of characters is acceptable and information indicating a category set for the string. The processor of a character recognition system can therefore use the ending subsequence to obtain ending data indicating that the string is acceptable and indicating the string's category set.

The technique described above is especially advantageous for data structured so that both prefixes and suffixes of strings can be collapsed to eliminate redundancy: Because the category indicators are relatively few in number, the data would include many occurrences of each category indicator if there were a category indicator for each acceptable string. But if the category indicator of each string is stored at the end of the string's suffix, collapsing suffixes greatly reduces the number of category indicators in the data. Suffixes can be collapsed with well-known minimization algorithms applicable to directed graphs or other data representing FSMs.

String data that includes category indicators as described above can be stored by a data storage medium such as a floppy disk. The data storage medium can also include control data, such as instructions, that a processor can use in accessing the string data. The processor of a system performing character recognition can therefore use the control data and the string data to obtain data indicating whether a string of characters is an acceptable string and indicating a set of categories for the string if it is acceptable.

The following description, the drawings, and the claims further set forth these and other aspects, objects, features, and advantages of the invention.

DETAILED DESCRIPTION

A. Conceptual Framework

Figure 1:
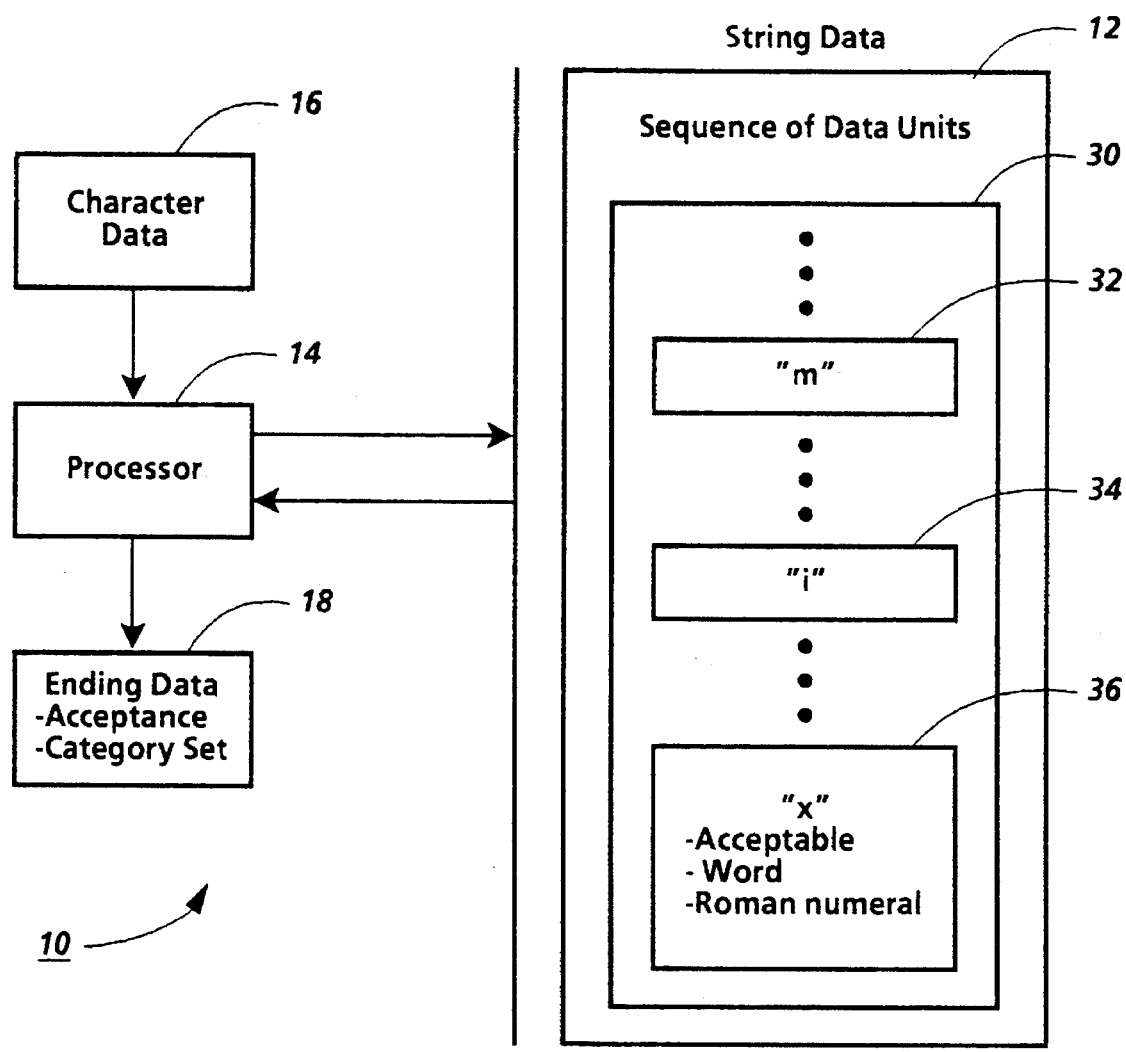
FIG. 1 is a schematic block diagram showing components of a system in which a processor can use string data to obtain category set data for a string.

The following conceptual framework is helpful in understanding the broad scope of the invention, and the terms defined below have the indicated meanings throughout this application, including the claims.

"Data" refers herein to signals that indicate or include information. When an item of data can indicate one of a number of possible alternatives, the item of data has one of a number of "values." For example, a binary item of data, also referred to as a "bit," has one of two values, such as "0" and "1" or "ON" and "OFF." An N-bit bit vector has one of $2^N$ values.

"Data" includes data existing in any physical form, and includes data that is transitory or is being stored or transmitted. For example, data could exist as an electromagnetic or other transmitted signal or as a signal stored in electronic, magnetic, or other form.

A "data storage medium" or "storage medium" is a physical medium that stores data. A "data transmission medium" or "transmission medium" is a physical medium that transmits data from one location to another.

A "data processing system" is a system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer data from one of the components to the other. For example, two processing units are "connected" by any combination of connections between them that permits transfer of data from one of the processing units to the other.

"Memory" is any component, combination of components, or system that can store data, and may include local and remote memory and input/output devices.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A processor "operates on" data by performing an operation that includes obtaining resulting data that depends on the data operated on. For example, the resulting data could result from an operation that accesses the data operated on or from a logical or numerical operation on the data operated on.

A "data unit" or "unit of data" is an item of data that a processor can access or otherwise operate on as a unit. For example, an eight-bit byte is a data unit in many data processing systems.

A processor "uses" data in performing an operation when the result of the operation depends on the value of the data. Stored data can be "accessed using" or "accessible using" other data if the memory containing the stored data responds to the other data or to data that depends on the other data by permitting access to the stored data. For example, the other data may be an address, an offset used to produce an address, or a content-addressable value stored with the stored data.

An "instruction" is an item of data that a processor can use to determine its own operation. A processor "executes" a set of instructions when it uses the instructions to determine its operations.

A processor can access a following set of data units "after accessing" a previous set of data units if the processor can use a position of the previous data units or information included in the previous data units to obtain data indicating a position at which the following set of data units can be accessed. A "sequence" or "subsequence" of data units is a set of data units that a processor can access in sequence; in other words, once the first data unit in a sequence or subsequence has been accessed, each subsequent data unit can be accessed after accessing previous data units in the sequence or subsequence. Similarity, a processor can access a subsequence "at the end" of a sequence if the subsequence can be accessed after accessing the entire previous part of the sequence and if no additional part of the sequence can be accessed after accessing the subsequence. In general, the term "ending subsequence" refers to a subsequence that can be accessed at the end of a sequence and the term "medial subsequence" refers to a subsequence that occurs in the part of a sequence previous to its ending subsequence.

Data "indicates" an attribute when the data has a value that depends on the existence of the attribute or on a measure of the attribute.

To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data.

An operation "encodes" data items when performing the operation on the data items produces different data from which the encoded data items can subsequently be recovered. The operation that recovers the encoded data items is "decoding."

An item of data "includes" information indicating an attribute if data indicating the attribute can be obtained by operating on the item of data. For example, a set of data units includes information indicating an attribute if it includes a bit or set of bits whose value indicates the attribute, or if one or more of the data units may be decoded to obtain data whose value indicates the attribute. Conversely, an item of information that indicates an attribute can be said to "include" an item of data if data indicating the attribute can be obtained by operating on the item of data.

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A "character type" is a category of which a character may be an instance, such as the letter "a" or the number "3".

A "character recognition system" is a system that can operate on data defining attributes of a character other than its character type to obtain data indicating its character type.

A "word" is a set of one or more characters that is treated as a semantic unit in a language.

A string of characters is "acceptable" in a given system if that system accepts the string of characters.

A string of characters is "in a category" if the category covers a set of strings of characters and the set includes the string. The set of strings covered by a category can be infinite.

B. General Features

Figure 2:
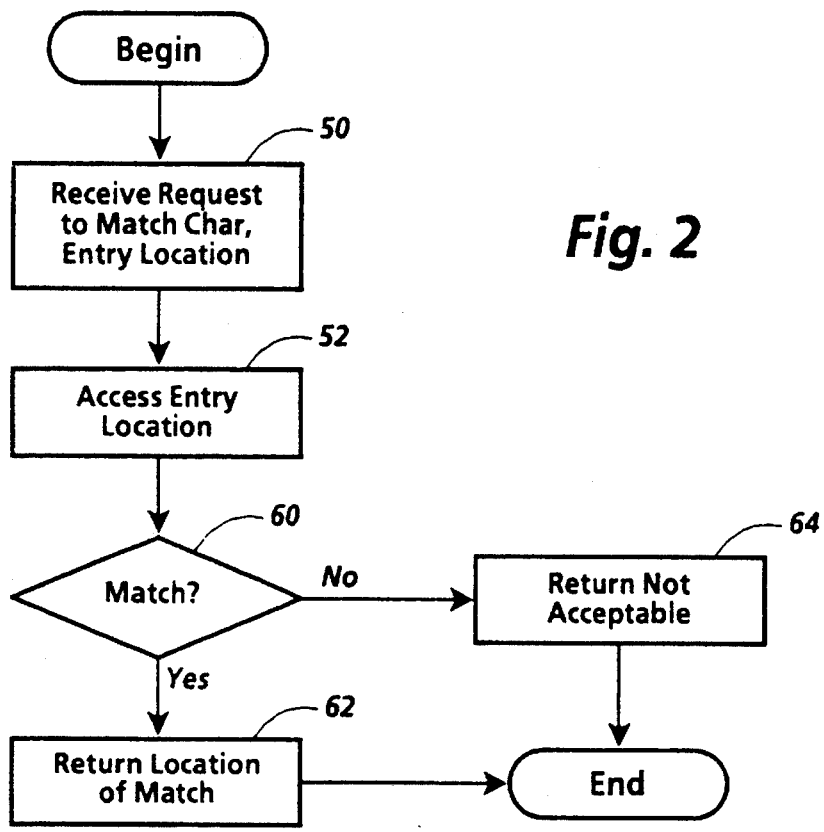
FIG. 2 is a flow chart showing general steps by which the processor in FIG. 1 can match a character using the string data.

FIGS. 1–2 illustrate general features of the invention. FIG. 1 illustrates general features of string data that can be accessed to obtain acceptance data and category set data. FIG. 2 illustrates general steps in using string data like that shown in FIG. 1.

FIG. 1 shows system 10, in which string data 12 can be used. String data 12 can, for example, be stored by a data storage medium accessible by processor 14; for example, string data 12 could be stored in a software product such as a floppy disk, CD-ROM, or the like. Processor 14 can also receive character data 16 indicating characters of a string. Processor 14 can provide acceptance data 18 indicating that the string of characters is acceptable and also indicating a set of categories for the string.

FIG. 1 shows sequence of data units 30 within string data 12. If character data 16 indicates the characters "mix," for example, sequence 30 may include subsequence 32 indicating the character "m," subsequence 34 indicating the character "i," and subsequence 36 indicating the character "x." Each subsequence can include one or more data units.

A subsequence can include other information in addition to information indicating a character. For example, subsequence 36, in addition to information indicating the character "x," also includes information indicating that the string "mix" is acceptable and that its categories include word and roman numeral. This information can be used by processor 14 if it reaches the end of the string "mix" while accessing subsequence 36. Processor 14 can use this information to obtain acceptance data indicating that "mix" is an acceptable string and to obtain category set data indicating a set of categories for "mix" that includes word and roman numeral.

FIG. 2 shows steps processor 14 could follow in using string data 12 to match a character. The step in box 50 begins by receiving a request to match a character and an entry location. This entry location could be a location representing a start state of an FSM or it could be another location within string data 12 from which data units can be accessed that indicate a set of alternative characters that can follow the entry location. For example, it could be the location of a character's subsequence of data units. The data units that can be accessed from the entry location can include a respective subsequence of data units for each of the alternative following characters.

The step in box 52 accesses the entry location in string data 12. The step in box 60 then accesses the data units that indicate alternative following characters until it determines whether the character matches one of the characters that can follow the entry location. If so, the step in box 62 returns the location of the matching character's subsequence, but if the character does not match any of the alternative following characters, the step in box 64 returns data indicating that the string being matched is not acceptable.

Figure 3:
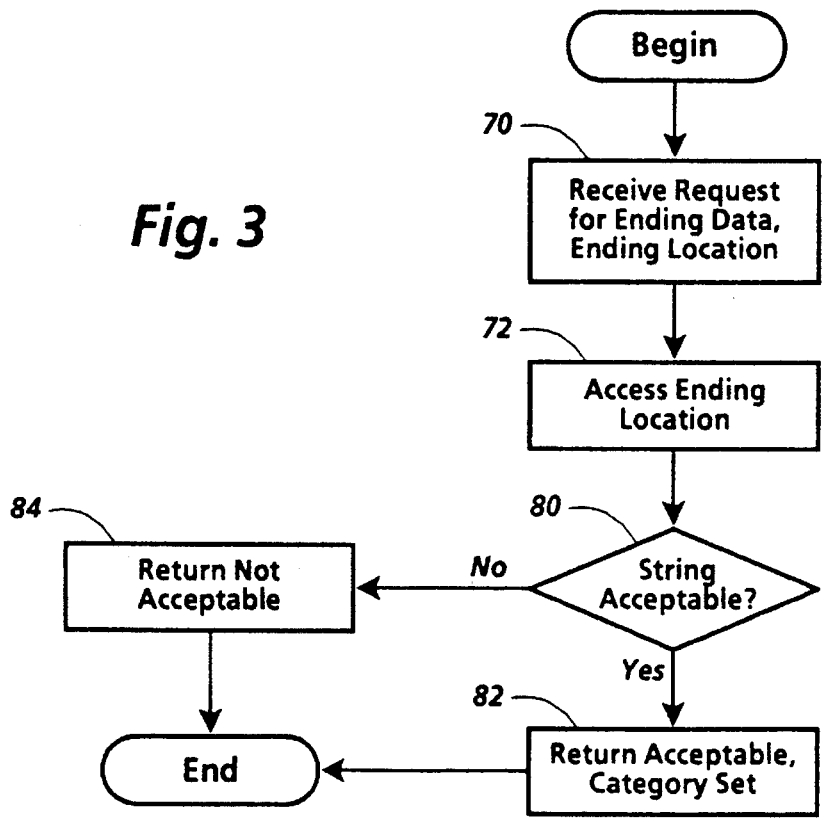
FIG. 3 is a flow chart showing general steps by which the processor in FIG. 1 can obtain ending data using the string data.

FIG. 3 shows steps processor 14 could follow in using string data 16 to obtain ending data for a string. The step in box 70 begins by receiving a request for ending data and an ending location. The step in box 72 accesses the ending location in string data 12. The step in box 80 determines whether the string that ends at the ending location is an acceptable string. If so, the step in box 82 returns ending data indicating the string is acceptable and also indicating a set of categories for the string. If the string is not acceptable, the step in box 84 returns data indicating it is not acceptable. The steps in boxes 80, 82, and 84 can be performed using acceptance information and category set information from an ending subsequence, such as ending subsequence 36 in FIG. 9.

The steps in FIGS. 2 and 3 can be used together in character recognition. For example, processor 14 could perform the steps in FIG. 2 for each character of a candidate string. If any character cannot be matched starting at the location at which the preceding character was matched, processor 14 could obtain data indicating the string is not acceptable. Upon matching the last character of the string: processor 14 could perform the steps in FIG. 3 at the location where the last character was matched to determine whether the string is acceptable and to obtain data indicating its category set if it is acceptable.

C. Implementation

The general features described above could be implemented in numerous ways on various machines. The invention has been implemented in the Medley version of the Lisp programming language available from Venue Corporation for execution on a Sun SparcStation and in the C programming language for execution on a Sun SparcStation, a Macintosh personal computer, and other machines.

1. Character Subsequences

Figure 4:
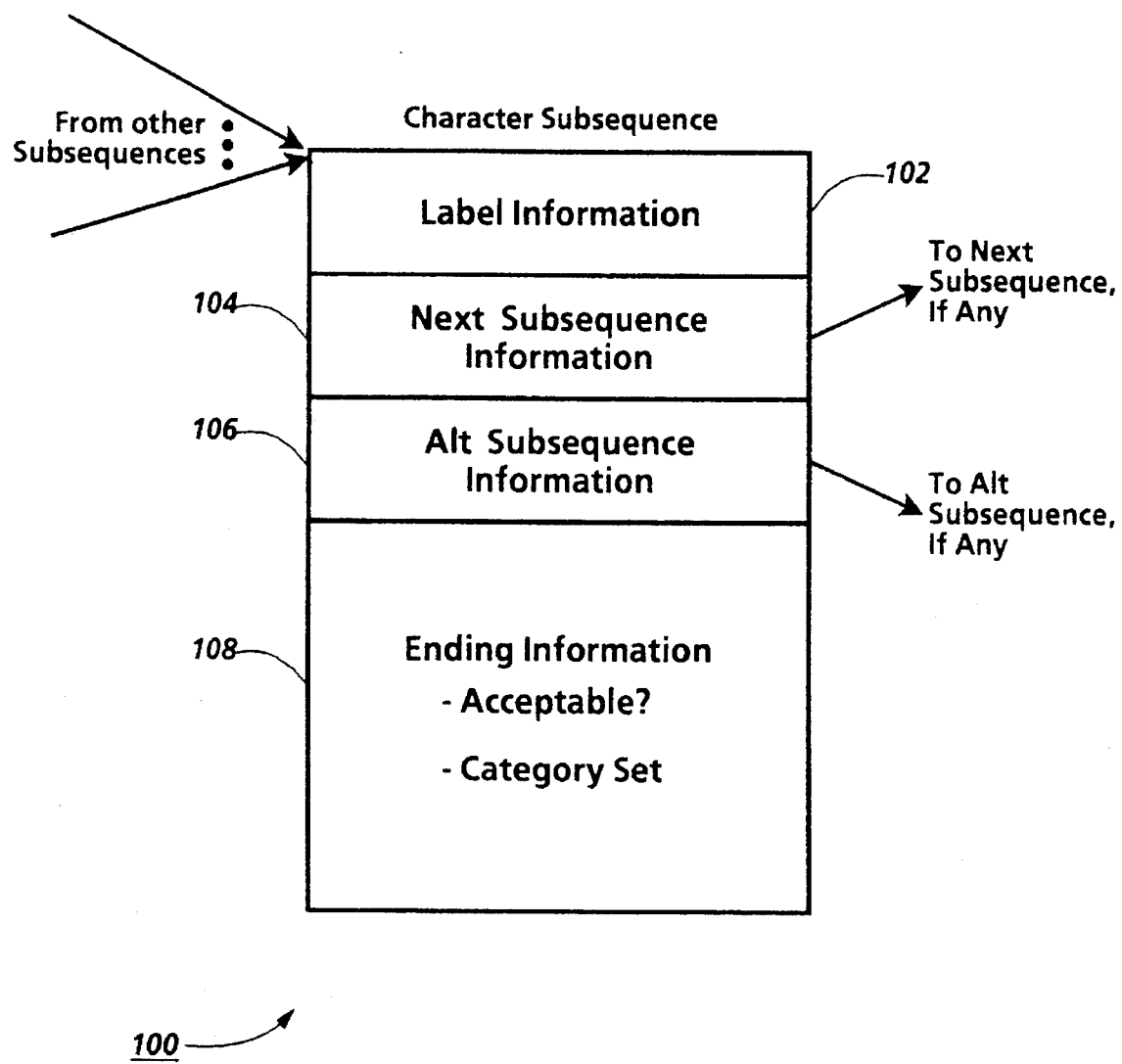
FIG. 4 is a schematic diagram of a character subsequence showing information it includes and its links to other subsequences.
Figure 5:
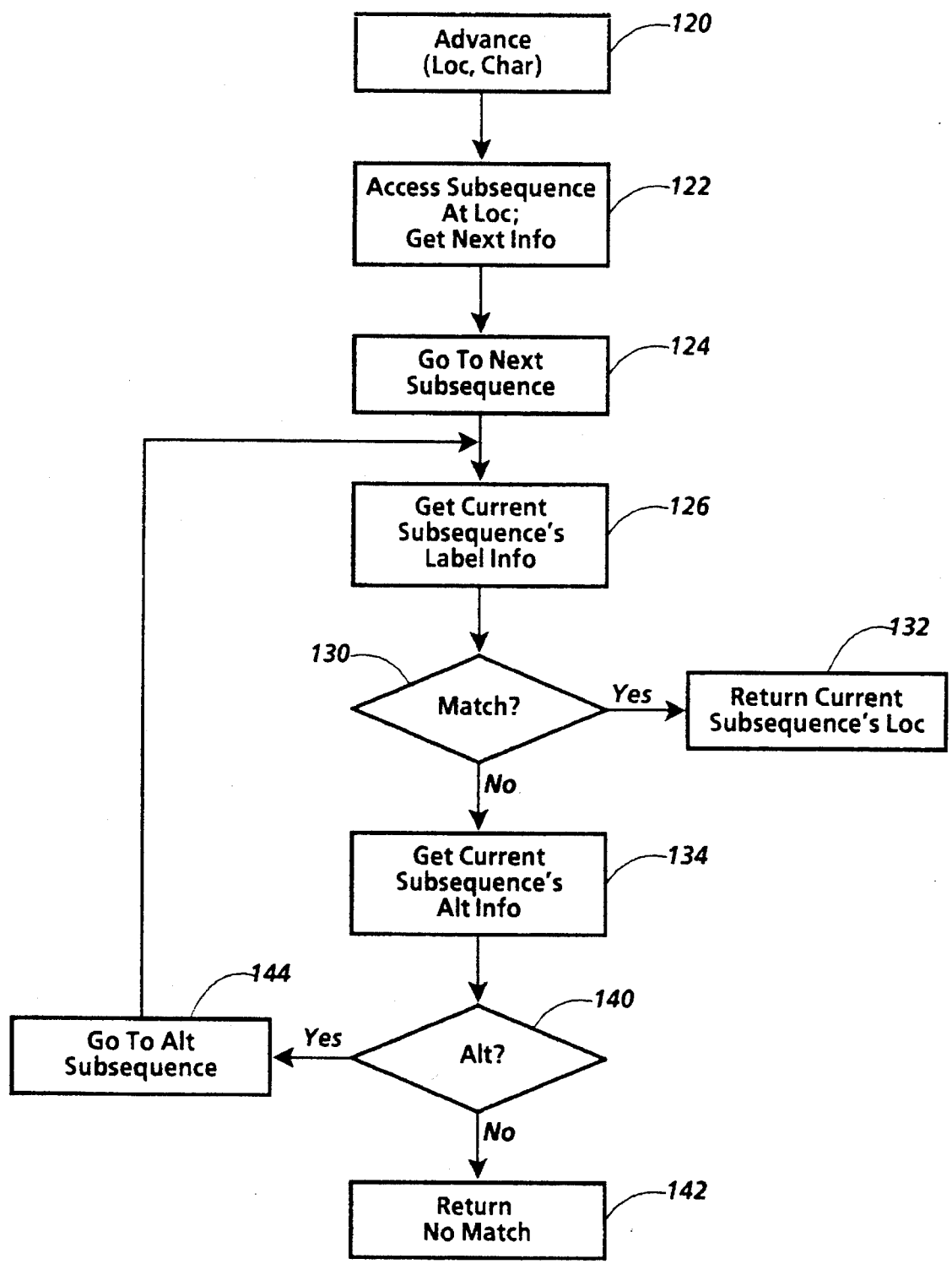
FIG. 5 is a flow chart showing steps in accessing subsequences like that in FIG. 4 in matching a character.
Figure 6:
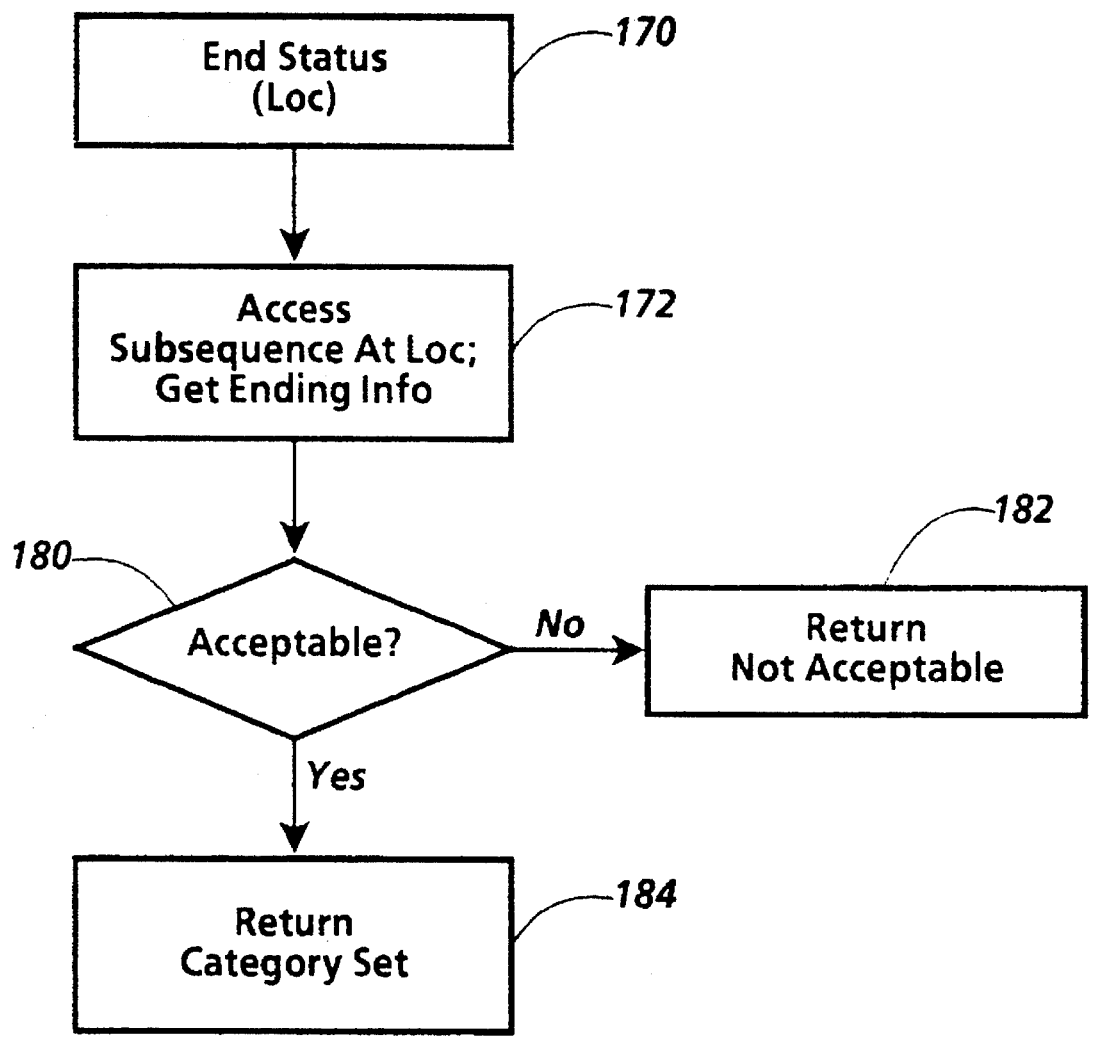
FIG. 6 is a flow chart showing steps in accessing a subsequence like that in FIG. 4 in obtaining ending data indicating whether a string is acceptable and its category set.

FIGS. 4–6 illustrate high level features of string data that can be used in implementing the invention. FIG. 4 shows a character subsequence and its relationship to other subsequences. FIG. 5 shows steps in accessing character subsequences in response to a request to match a character. FIG. 6 shows steps in accessing a character subsequence in response to a request for ending data.

Character subsequence 100 in FIG. 4 includes several types of information. Label information 102 indicates a character type. Next subsequence information 104 indicates whether subsequence 100 has a next subsequence and, if so, the location of the next subsequence. Alt subsequence information 106 indicates whether subsequence 100 has an alternative subsequence and, if so, the location of the alternative subsequence. Ending information 108 indicates whether a string that ends with a character matching label information 102 is an acceptable string and, if so, a category set for the string.

An interlinked set of character subsequences like that shown in FIG. 4 can be linked together to represent an FSM. As shown, character subsequence 100 could be the next or alternative subsequence for one or more other subsequences.

FIG. 5 generally follows the steps in FIG. 2. The step in box 120 begins upon receiving a call to a function designated "Advance," which is called with a location and a character type. The step in box 122 uses the location to access a character subsequence. The step in box 122 also uses the subsequence's next information to obtain data indicating the location of the subsequence's next subsequence. The step in box 124 uses the data indicating the next subsequence's location to access it.

The step in box 126 begins an iterative loop that accesses the next subsequence and its alternative subsequences, if any, to find a match. The step in box 126 uses the current subsequence's label information to obtain data indicating a character type. The step in box 130 branches based on whether this character type is the same as the character type received in box 120. If so, the step in box 132 returns data indicating the current subsequence's location. But if not, the step in box 134 uses the current subsequence's alt information to obtain data indicating whether the subsequence has an alternative subsequence and, if so, the location of the alternative subsequence.

If the current subsequence does not have an alternative subsequence, the branch in box 140 leads; to the step in box 142, which returns data indicating that the character received in box 120 cannot be matched. But if the subsequence has an alternative subsequence, the step in box 144 uses the data indicating the alternative subsequence's location to access it before returning to the step in box 126.

FIG. 6 generally follows; the steps in FIG. 3. The step in box 170 begins upon receiving a call to a function designated "End Status," which is called with a location. The step in box 172 uses the location to access a character subsequence. The step in box 172 also uses the subsequence's ending information to obtain data indicating whether the subsequence is the ending subsequence of an acceptable string and, if so, a set of categories for the string.

If the subsequence is not the ending subsequence of an acceptable string, the branch in box 180 leads to the step in box 182, which returns data indicating that the string is not acceptable. But if the subsequence is the ending subsequence of an acceptable string, the step in box 184 returns data indicating the set of categories for the string, data which also implicitly indicates that the string is acceptable.

2. Encoding and Decoding

Figure 7:
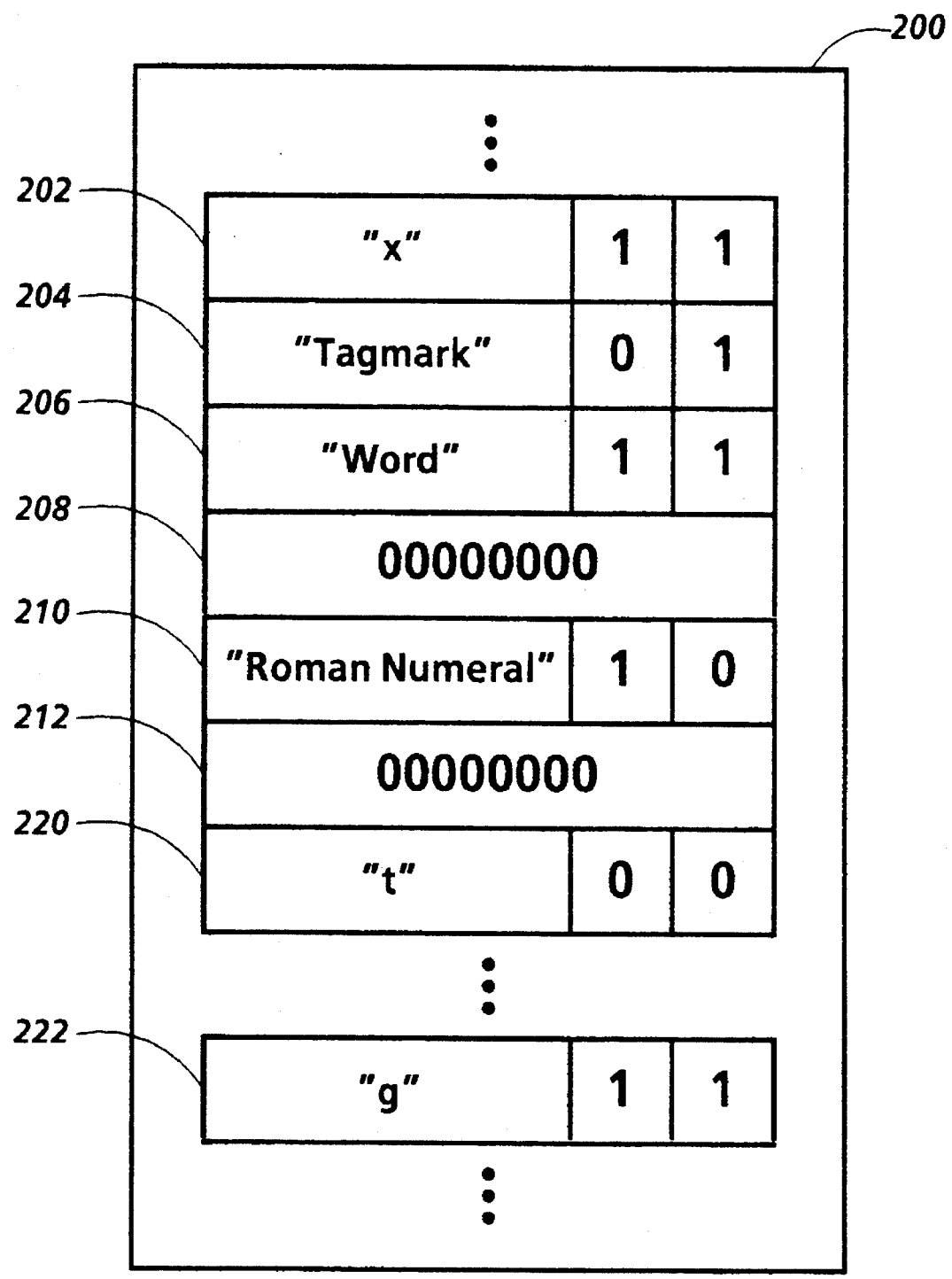
FIG. 7 is a schematic drawing showing a character subsequence of data units.
Figure 8:
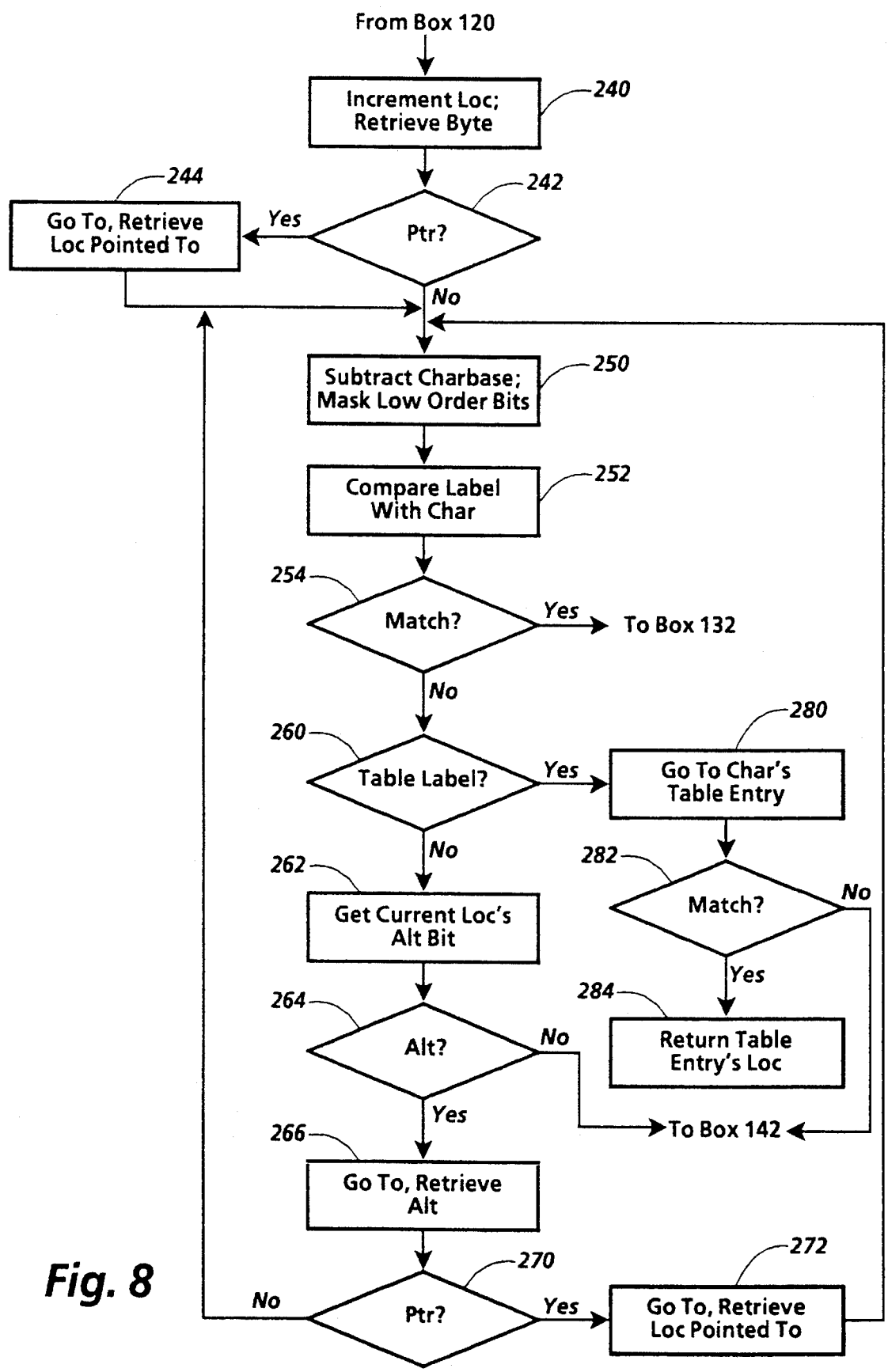
FIG. 8 is a flowchart showing more detailed steps for implementing the technique of FIG. 5.
Figure 9:
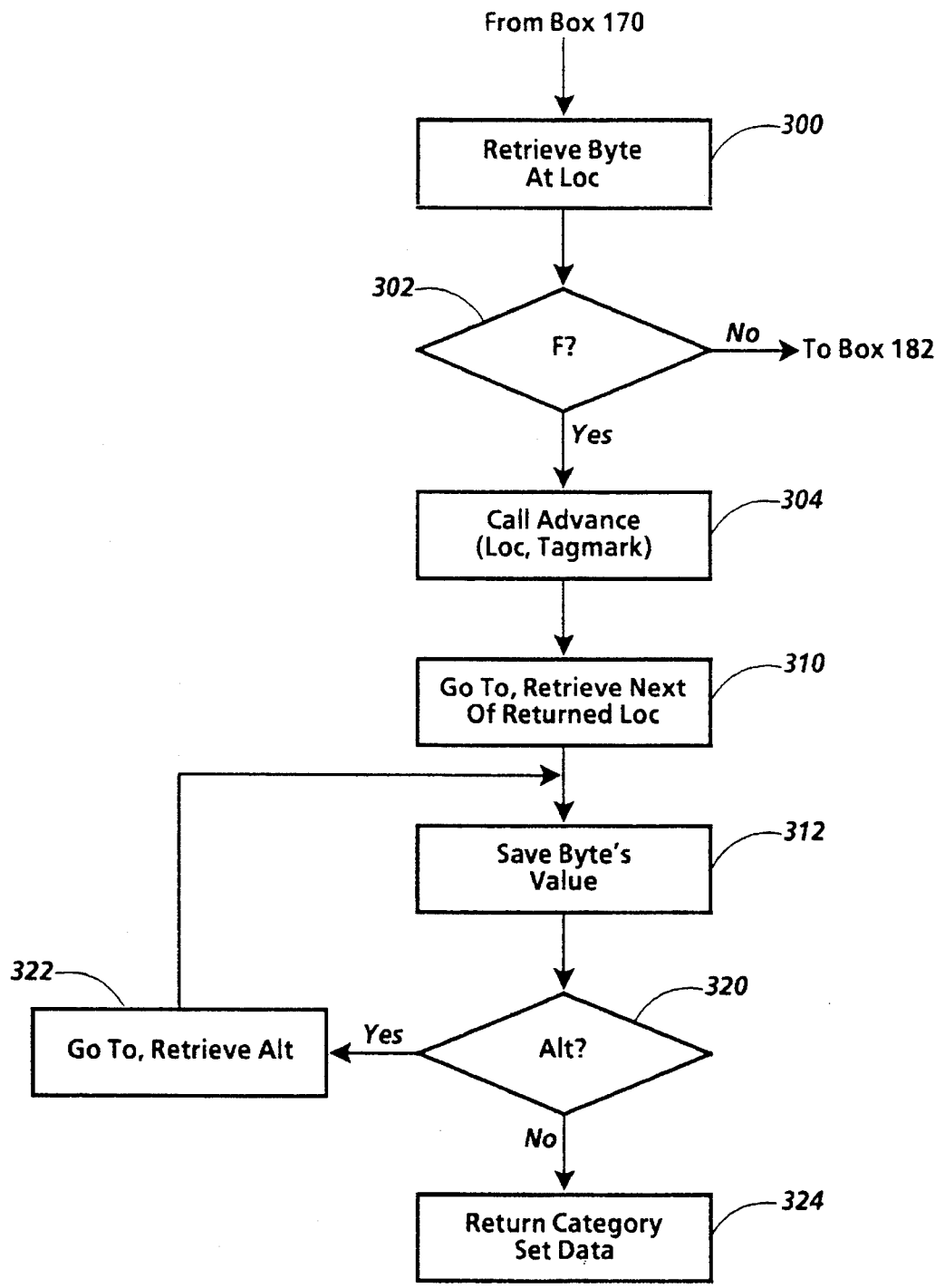
FIG. 9 is a flowchart showing more detailed steps for implementing the technique of FIG. 6.
Figure 10:
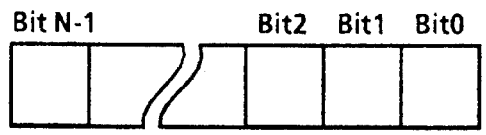
FIG. 10 is a schematic drawing of an N-bit vector for returning category set data.

Character subsequences could be encoded and decoded in many ways in implementing the invention. Table I shows one way a byte value space can be allocated to permit use of some byte values both as character bytes and as category bytes. FIG. 7 shows a character subsequence in which each data unit is a byte value from the allocation of Table I. FIG. 8 shows how steps in FIG. 5 could be implemented for the allocation of Table I. FIG. 9 shows steps for obtaining category set data. FIG. 10 shows a bit vector for returning category set data.

Table I allocates byte values in a way similar to that shown in FIG. 4 of copending coassigned U.S. patent application Ser. No. 07/619,821, a continuation of application Ser. No. 07/274,701, which was in turn a continuation of application Ser. No. 06/814,146, entitled "Encoding FSM Data Structures," originally filed Dec. 27, 1985, incorporated herein by reference, and referred to herein as "the FSM encoding application," now continued as U.S. patent application 07/855,129.

The byte values in Table I range from 0 to 255, and hence are eight bits in length. N is the number of distinct six-bit labels, explained in more detail below. $P_1$ is the number of long pointer byte codes, and $P_2$ is the number of midsize pointer byte codes. As can be seen in Table I, the number of short

TABLE I

| Byte Values | Interpretation |
| --- | --- |
| 0 | EOB Byte |
| 1 to $255 - (4N + P_1 + P_2)$ | Short Pointer |
| $256 - (4N + P_1 + P_2)$ to $255 - (4N + P_1)$ | Midsize Pointer |
| $256 - (4N + P_1)$ to $255 - 4N$ | Long Pointer |
| $256 - 4N$ to $259 - 4N$ | Tagmark or Category Types I–IV |
| $260 - 4N$ to $251$ | Characters or Categories Types I–IV |
| 252–255 | Table Label Types I–IV | pointer byte codes is $255-(4N+P_1+P_2)$. The allocation and interpretation of pointers generally follows the techniques disclosed in the FSM encoding application and in copending coassigned U.S. patent application Ser. No. 776,909, a continuation of application Ser. No. 07/563,885, which was in turn a continuation of application Ser. No. 07/054,462, entitled "Word/Number and Number/Word Mapping," originally filed May 26, 1987, incorporated herein by reference, and referred to herein as "the mapping application."

The byte value allocation of the FSM encoding application differs from that of Table I in several ways. In the FSM encoding application, blocks of byte values were allocated to characters of six different types, each type being some combination of final, alternative, and EOB, meaning end of branch. In Table I, however, a special EOB byte is allocated the value zero, and can follow any byte that represents an end of branch. In the current implementation, if this byte is treated as a short pointer byte, it points to a data unit that is not fined and that begins a subsequence that cycles back to itself, ensuring that a final data unit cannot be reached after the EOB byte.

As a result of the EOB byte, each character has only four different types, the character's four possible combinations of final, also referred to herein as acceptable, and alternative, also referred to herein as alt. Having only four types of characters is advantageous because the type of each character can be represented by two bits, which can be masked for comparison, avoiding the need to do a table lookup or other complicated decoding of a byte value. Therefore, rather than allocating blocks as in the FSM encoding application, Table I allocates four consecutive byte values to each of N–2 characters.

Another difference is that Table I allocates four consecutive byte values to a tagmark, which is not interpreted as a character but rather indicates that the preceding character is the end of an acceptable string. The bytes following a tagmark can thus be interpreted as something other than characters, and Table I shows that the tagmark byte value and the character byte values can also be interpreted as category byte values. This interpretation is applied to a byte value in the tagmark and character/category ranges if it is accessed in a sequence of data units after accessing a tagmark.

Yet another difference is that Table I allocates four consecutive byte values to a table label, which is interpreted neither as a character nor as a category, but rather indicates that the next bytes are a pointer to a table. Table labels are an optional technique that can be used to reduce the time necessary to search the string data representing an FSM in cases where a state in the FSM has a large number of outgoing transitions. Table labels have been found to be advantageous where an FSM transducer summarizes general rules, where an FSM permits compounding of acceptable strings, or where an FSM is used to classify strings that may be composites of acceptable strings and other elements such as punctuation marks. States in such situations resemble the FSM's start state, which has a large number of outgoing transitions.

Each table can be implemented with N−1 entries, so that there is one entry for each of the label values, from the tagmark byte through the character/category bytes; because the table label has the highest label value, the table need not have an entry for the table label itself. The entries are of equal length, so that the entry for a given label value can be accessed by multiplying the six-bit label value by the entry length to obtain an offset into the table.

Each entry begins with a label byte. If a label value can be matched from the location preceding the table label, the label value's entry has a label byte with the same label value. But if the label value cannot be matched from the location preceding the table label, the label value's entry has a label byte with a different label value; for example, a table label byte could be used as the label byte for each entry that cannot be matched, since its label value is different than the label value of any of the entries.

Each entry also includes a pointer field following the label byte, and the pointer field is large enough to hold a full length pointer. In the current implementation, each full length pointer is three bytes, so that the entry length is four bytes. If a label value can be matched from the location preceding the table label, the pointer field of the label value's table entry contains a pointer to the next subsequence for the label or the special EOB byte if there is no next subsequence.

A table as described above can be shared by a state for which some of the table's entries are inappropriate. This can be done if the outgoing transitions for each state are ordered so that the table label is always the last transition. Preceding outgoing transitions can be used to provide information for transitions for which the table entry is inappropriate.

In general, the choice of which states should be followed by table labels involves a complex time-space tradeoff that may depend heavily on the specific data and task. The use of more tables improves search speed, but may increase the space needed to store the string data, which include the tables. In certain situations, such as states representing alternative terminal punctuation marks, tables produce dramatic speed improvement, and also reduce the overall space because a large number of states may share a given table.

Like the character/category byte values, the two low order bits of the tagmark byte value can be used to indicate whether it has an alternative data unit. The bit indicating whether a tagmark is the end of an acceptable string does not matter, since the tagmark itself is never the end of an acceptable string, but always follows a character that is the end of an acceptable string. The first byte value for the tagmark, referred to herein as "CharBase," is 256−4N, an integer multiple of 4. Therefore, the two low order bits of each character byte can be masked to obtain six high order bits identifying the character.

The two low order bits of the table label can similarly be used to provide useful information, if advantageous. For example, they could be used to indicate the length of the pointer to the table.

The character/category bytes can include an escape code, as described in the mapping application in relation to escape codes. The escape code plus another byte that follows it in the string data can be used to encode characters if the total number of characters is greater than N−2, which is likely to be the case if N is chosen to optimize the number of pointers of each size. If escape codes are used for all characters that appear at ends of acceptable strings, such as terminal punctuation marks, the terminal punctuation marks may all be collapsed to a single state that also has a single transition back to the start state for a hyphen or other characters that may join the parts of a compound word. But it may be desirable to use an escape code for other characters, so that the choice of when to use escape codes is also a complex tradeoff.

A wide variety of alternative encodings could be used if advantageous for particular data or for a particular task. For example, the special EOB byte could be omitted if all branches end with a category byte and if every category byte is an end of branch. It might also be possible to use a single bit to indicate whether a character byte or a category byte has an alternative, if a character byte that is final is always followed by a tagmark byte and if a category byte is always final. These approaches could, for example, be used to increase the number of short pointers. The tagmark byte could also be eliminated if distinct blocks of values were allocated to characters and to categories, because the category bytes following a final character byte could be positioned as the first outgoing transitions—presence of a category byte following a character byte would indicate that the character byte is at the end of an acceptable string and that the category byte is at the beginning of a set of category bytes for the string.

The tagmark byte or its equivalent in other encodings can be thought of as a special transition that follows every final state in an FSM. Following a tagmark transition are a set of bytes that are decoded as categories of strings applicable to all the strings that ended at the final state. Examples of categories include main lexicon, user lexicon, roman numeral, arabic numeral, phone number, date, etc.

FIG. 7 shows a number of data units within sequence of data units 200. Data units 202, 204, 206, 208, 210, and 212 together form a character subsequence that includes the same information as subsequence 36 in FIG. 1. Data unit 220 is at the beginning of the subsequence's next character subsequence and data unit 222 is at the beginning of the subsequence's alternative character subsequence. Data unit 204, the tagmark byte, is illustratively shown as the next byte of data unit 202, so that the data units of the character subsequence are contiguous, but data unit 220 could instead be the next byte and data unit 204 could be an alternative, in which case the data units of the character would not be contiguous as shown.

The data units within sequence 200 illustrate all the ranges of byte values in Table I except pointers. Data units 202, 220, and 222 are character bytes. Data unit 204 is a tagmark byte. Data units 206 and 210 are category bytes. And data units 208 and 212 are EOB bytes.

Each of the character bytes includes two low order bits as shown, the first indicating whether the byte is at the end of an acceptable string and the second indicating wherever the byte has an alternative. In the tagmark byte, the first low order bit indicates that the byte is not at the end of an acceptable string and the second indicates whether the byte has an alternative. In each of the category bytes, the first low order bit indicates that the byte is at the end of an acceptable string and the second indicates whether the byte has an alternative.

The steps in FIG. 8 can replace the steps following box 120 in FIG. 5 if byte values are allocated as in Table I. The step in box 240 increments the location received in box 120 in FIG. 5 and retrieves the byte value at the incremented location. The step in box 242 branches based on whether the retrieved byte value is less than Charbase, meaning that it is a pointer byte value. If so, the step in box 244 goes to the location indicated by the pointer and retrieves the byte at that location. This can be done as described in the FSM encoding application and in the mapping application.

When a byte is retrieved that is not a pointer, the step in box 250 subtracts Charbase from the byte's value. If the character received in box 120 has previously been mapped into the range of character byte values by multiplying by four and adding Charbase, it is not necessary to subtract Charbase. The step in box 250 also masks the two low order bits, such as by logically ANDing the byte with the byte 11111100, producing the byte's label.

The step in box 252 compares the label from box 250 with the character received in box 120. The step in box 254 branches based on the result of the comparison. If the label and character match, the step in box 132 in FIG. 5 is performed, returning the current location.

If the label and character do not match, the step in box 260 determines whether the label is the table label. If not, there may be further alternatives that should be considered. The step in box 262 obtains the current location's alt bit, which could be saved in the step in box 250. Then the step in box 264 branches based on whether the current location has an alternative. If not, the step in box 142 in FIG. 5 is performed, returning data indicating the character received in box 120 could not be matched.

If the current location has an alternative, the step in box 266 goes to the alternative's location and retrieves the byte at that location. The alternative can be found by counting alt bits and EOB bytes in the same manner as alts and EOBSs are counted in the FSM encoding application and the mapping application. Then the step in box 270 branches based on whether the byte is a pointer, as in box 242. If not, the alternative has been reached so that the step in box 250 can be performed again. If the byte is a pointer, the byte at the location it points to is retrieved as in box 244 before performing the step in box 250.

When the table label is found in box 260, the step in box 280 uses the character received in box 120 to access the appropriate table entry. As noted above, this can be done by multiplying the character by four and adding the result to the pointer that follows the table label. Then, the test in box 282 branches based on whether the character matches the label byte of the table entry. If the character does not match the label byte, the step in box 142 in FIG. 5 is performed, returning data indicating the character received in box 120 could not be matched. But if the character matches, the location of the table entry is returned in box 282, which has the same effect as returning the current subsequence's location in box 132 in FIG. 5.

The steps in FIG. 8 can be performed beginning at the location of data unit 202 in FIG. 7. If the next character after the character "x" is a "t," for example, the first iteration of the step in box 254 finds a mismatch with the tagmark label in data unit 204. The step in box 266 counts alt bits and EOB bytes in order to reach data unit 220, and the second iteration of the step in box 254 finds a match with the "t" label, so that the location of data unit 220 is returned in the step in box 132 in FIG. 5.

FIG. 9 shows steps in obtaining category set data. The steps in FIG. 9 can replace boxes 172, 180, and 184 in FIG. 6 if byte values are allocated as in Table I.

The step in box 300 retrieves the byte at the location received in box 170 in FIG. 6. The step in box 302 then branches based on whether the byte value is at the end of an acceptable string, as indicated by its final bit. If not, the current character subsequence is not the ending subsequence of an acceptable string, so no match is returned in box 182. If the byte value is at the end of an acceptable string, the step in box 304 obtains the location of the tagmark byte by calling Advance (Loc, Tagmark). The steps in FIGS. 5 and 8 are performed, returning the tagmark's location. The step in box 310 goes to and retrieves the next byte of the location returned by Advance. This step is the same as the steps in boxes 240, 242, and 244 in FIG. 8. Then the step in box 312 saves data indicating the six high order bits of the retrieved byte, because those bits indicate one of the categories for the acceptable string. Then, the step in box 320 branches based on the retrieved byte's alt bit. If the alt bit is on, the step in box 322 goes to and retrieves the byte's alternative byte as described above in relation to boxes 266, 270, and 272 in FIG. 8. Then the step in box 312 is performed again. If the alt bit is off, the step in box 324 returns category set data based on the data saved in box 312.

The steps in FIG. 9 can be performed beginning at the location of data unit 202 in FIG. 7 after matching the character "x." The category set data returned in box 324 indicates the categories "word" and "roman numeral."

FIG. 10 shows N-bit vector 350 that can be used to save byte values in box 312 and to return category set data in box 324. The step in box 312 can remove the final and alt bits from the byte value and use the higher order bits to indicate which bit in vector 350 should be set to save the byte value. When all the category bytes have been handled in box 312, vector 350 can be returned in box 324 as the category set data. Vector 350 with all zeroes can also be used to return data indicating that a string is not acceptable in box 182 in FIG. 6, since at least one bit must be set if a string is acceptable.

As described in abandoned U.S. patent application Ser. No. 07/310,032, a continuation of application Ser. No. 07/193,231, which was in turn a continuation of application Ser. No. 06/814,147, entitled "FSM Data Structure for Spell Checking," originally filed Dec. 27, 1985, incorporated herein by reference, and referred to herein as "the spell checking application," a more compact data structure can sometimes be obtained by systematically introducing epsilon transitions into an FSM to facilitate sharing of the trailing portions of sets of outgoing transitions. In other words, every state in the FSM can be expanded into a series of binary states, all but the last of which have an epsilon transition to the next binary state in the series. This epsilon-sharing technique also includes minimizing the expanded FSM, after which extra epsilon transitions are removed.

If the epsilon-sharing technique is used, the order in which the category bytes are arranged following a tagmark byte can be chosen to improve collapsing on the right. For example, the most frequently occurring category can be the last in each set of category bytes, the least frequent first, and so forth. In the allocation of Table I, it may be advantageous to assign the most frequently occurring category to the same byte value as the most frequently occurring character for additional collapsing. In general, the objective is to strengthen the frequency skew to obtain better data compression.

3. Product

Figure 11:
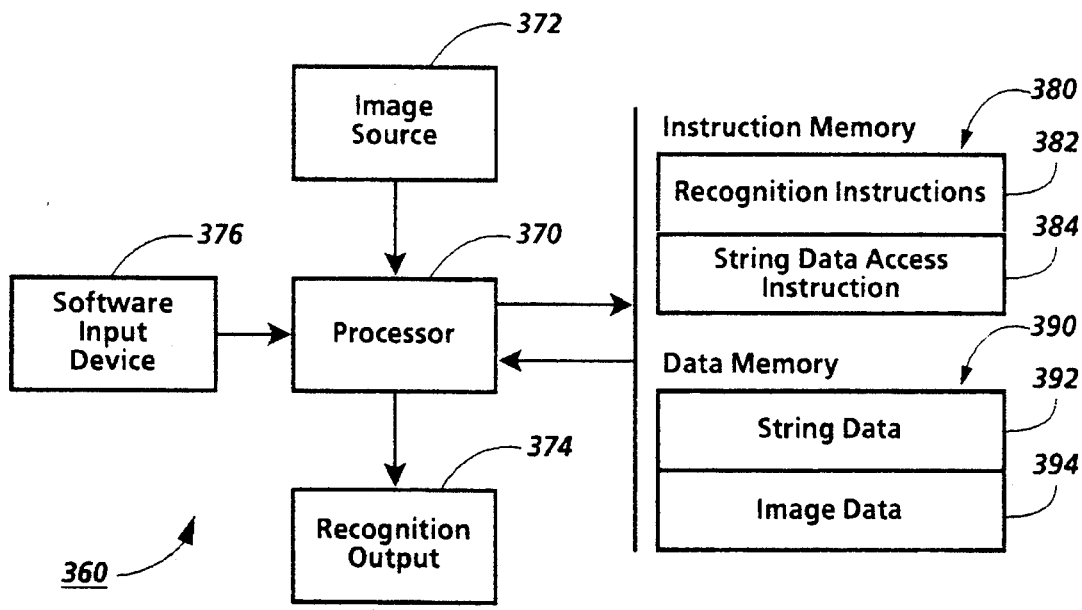
FIG. 11 is a schematic block diagram showing components of a system using string data for recognition.
Figure 12:
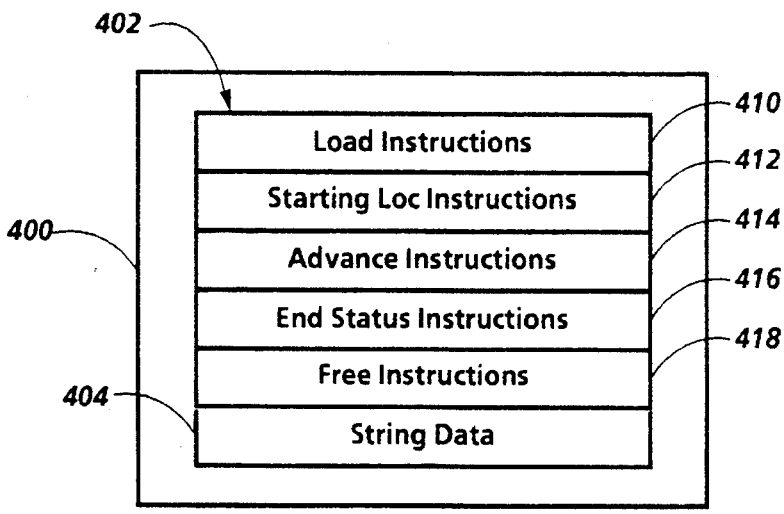
FIG. 12 is a schematic drawing of a software product including string data.

Encoded string data as described above can be used in a recognition system as illustrated in FIG. 11. FIG. 12 shows a software product that can be used in such a system.

In FIG. 11, processor 370 is connected to receive data defining images from image source 372, which could for example be a scanner. Processor 370 is also connected to provide data indicating recognition results to recognition output 374, which could for example be a display. Processor 370 is also connected to load software from software input device 376, which could be a floppy disk drive, a CD-ROM player, modem, network link, or other peripheral device that can access software on a data storage medium or receive software transmitted through a communication channel.

In performing recognition, processor 370 accesses instruction memory 380 and executes recognition instructions 382, which include calls to string data access instructions 384. Data memory 390 stores data for access by processor 370. Processor 370 accesses string data 392 in executing string data access instructions 384 and accesses image data 394 in executing recognition instructions 382.

Software product 400 in FIG. 12 includes data storage medium 402, which could be a floppy disk, a CD-ROM, magnetic tape, or another medium that can store data. Medium 402 stores string data 404 and instructions that can be executed in relation to string data 404.

In the implementation shown in FIG. 12, the instructions include load instructions 410, starting location instructions 412, advance instructions 414, end status instructions 416, and free instructions 418.

Load instructions 410 can include a routine that processor 370 executes to load string data 404 into data memory 390. This routine returns the memory location of a header that includes one or more offsets for accessing start states within string data 404. Processor 370 may also load the instructions on medium 402 into instruction memory 380 before execution.

Starting location instructions 412 can include a routine that processor 370 executes to obtain data indicating the starting location for accessing string data 404 within data memory 390. This routine can be called with the memory location of the header returned by load instructions 410 and with a start state identifier. The routine then accesses the header, obtains the offset to the identified start state, uses the offset to obtain the start state's access location in memory, and returns the access location. For consistency with other instructions, the access location for a start state is the location whose next subsequence is to be matched in response to the initial character of a string.

Advance instructions 414 can include a routine that processor 370 executes to advance within string data 404, given a location and a character. In other words, the routine can perform steps like those in FIG. 2.

End status instructions 416 can include a routine that processor 370 executes to obtain data indicating whether a given location is at the end of an acceptable string and, if so, a category set of the string. In other words, the routine can perform steps like those in FIG. 3.

Free instructions 418 can include a routine that processor 370 executes to flush string data 404 from data memory 390.

Recognition instructions 382 in FIG. 11 can include a routine that calls the instructions loaded from data storage medium 402. Because of the simplicity of the functions preformed by the instructions shown on medium 402, the interface to other software is relatively simple, and software product 400 could be used in a variety of recognition techniques.

String data 404 can be produced using techniques described in the FSM encoding application and in the spell checking application. The spell checking application describes how an FSM data structure can be obtained.

In the current implementation, preparation of variations of string data 404 is facilitated by providing a specialized user interface to FSM creation routines. The user can define a category of character strings either with the name of a file that includes a list of strings or with a definition in the form of a special grammar. The grammar can be used, for example, to define a category that has an infinite number of acceptable strings, such as the arabic numbers, arithmetic expressions, or currency amounts; to define a category in which the acceptable strings follow algorithmic rules, such as the roman numbers, phone numbers, or social security numbers; or to extend a category such as a list of strings by adding variations that include punctuation or hyphenation, that combine strings to form compound strings, or that include reasonable patterns of characters similar to those occurring in the strings in the list.

In the current implementation, a user can provide regular expressions that describe acceptable strings in various ways. For example, an expression can indicate that a string is acceptable if it includes, in sequence, a substring of beginning punctuation, an optional arabic numeral, a substring of separators, an acceptable string from a lexicon, another substring of separators, another acceptable string from the lexicon, and so forth, and ends with a substring of ending punctuation. Or, an expression can indicate that a string is acceptable if it includes, in sequence, a number from 1–9, a substring of from zero to two numbers from 0–9, and then either ends or continues with any number of substrings that include a comma followed by three numbers from 0–9.

The definition of each category is used to produce a respective FSM. Category data is included in each FSM indicating that each acceptable string of that FSM ends with a tagmark and category identifier. The category for a composite string as described above may be the category of one of its constituent parts, such as the last string.

If feasible, the FSMs for all the categories can be combined into a single FSM using the well known FSM union algorithm. The combined FSM is determinized and minimized, all without changing the acceptable set of strings. The resulting FSM has one start state. A sequence of states within the FSM may include a cycle, including a pointer from a state that leads back to the same state or to another state that occurred earlier in a sequence of states.

If it is computationally impractical to combine the FSMs for all categories into a single determinized, minimized FSM, one or more additional FSMs can be included, each with a respective start state and with category data so that each string it accepts ends with a special category identifier.

The resulting combination of one or more FSMs can then be encoded to produce a data structure like that described in the FSM encoding application. The data structure can be stored on data storage medium 402 in producing software product 400.

D. Applications

The invention could be applied to recognition problems in many ways, including incremental lookup techniques in which a main recognition routine checks a string by providing each character in sequence, so that if a set of unacceptable candidate strings share an unacceptable prefix, all of them can be eliminated in a single lookup operation. The main recognition routine can also maintain a data structure indicating the locations of previously provided characters so that backtracking to a previous choice point can be more efficient.

The technique is not limited to recognition of strings of characters, but might also be applied to recognition of strings of other types of elements where the strings fall into discrete categories. For example, in handwriting recognition, strings of strokes fall into word categories. Similarly, in speech recognition, strings of phonemes fall into word categories.

The technique might also be applied to spelling correction problems. For example, the technique might be applied to sequences of characters from an input device such as a keyboard, to assist in correcting mistakes in typing.

E. Miscellaneous

The invention has been described in relation to implementations in which a software product is delivered on a data storage medium. The invention might also be implemented with a software product delivered through transmission, such as through telephone lines or over a network.

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. An article of manufacture for use in a character recognition system that includes a processor; the article comprising:

a data storage medium; and string data stored by the data storage medium; the string data comprising two or more data units, each of which can be accessed by a processor of a character recognition system; the data units including, for each of a set of two or more acceptable strings of characters, a respective sequence of data units that the processor can access using character data indicating character types of the string's characters;

the set of acceptable strings including a first string that is in a first subset of categories, each category in the first subset being one of a set of two or more categories; the first string's sequence of data units including a respective ending subsequence of data units that the processor can access at the end of the first string's sequence and use to obtain first string ending data indicating that the first string is one of the acceptable strings and indicating the first subset of categories; the first string's ending subsequence including:

acceptance information indicating that a string at the end of whose respective sequence the processor can access the ending subsequence is one of the set of acceptable strings; and category set information indicating the first subset of categories; the first subset of categories including at least one of the set of categories.

2. The article of claim 1 in which each data unit is a byte.

3. The article of claim 1 in which the set of acceptable strings includes a subset of two or more strings that can be words of a language.

4. The article of claim 1 in which the set of acceptable strings includes a second string that is in a second subset of categories, each category in the second subset being in the set of categories; the second string's sequence of data units including a respective ending subsequence of data units that the processor can access at the end of the second string's sequence and use to obtain second string ending data; the second string ending data indicating that the second string is one of the acceptable strings and indicating the second subset of categories.

5. The article of claim 4 in which the first and second subsets of categories both include a shared one of the set of categories; the data units comprising a shared data unit indicating the shared category; the first string's ending subsequence and the second string's ending subsequence both including the shared data unit.

6. The article of claim 1 in which the first string includes an ending character having a respective character type; the first string's ending subsequence of data units including a character label data unit that includes character label information indicating the ending character's character type; the acceptance information including a bit in the character label data unit indicating that a string at the end of whose respective sequence the processor can access the ending subsequence is one of the acceptable strings.

7. The article of claim 1 in which the acceptance information includes an acceptance data unit in the first string's ending subsequence; the acceptance data unit having a value indicating that a string at the end of whose respective sequence the processor can access the ending subsequence is one of the acceptable strings.

8. The article of claim 7 in which the category set information includes a set of category data units in the first string's ending subsequence that the processor can access after accessing the acceptance data unit.

9. The article of claim 1 in which the category set information includes, for each category in the first subset of categories, a respective category data unit in the first string's ending subsequence; each category's category data unit having a value indicating the category.

10. The article of claim 9 in which the first subset of categories includes at least two categories, the category set information including at least two category data units in the first string's ending subsequence.

11. The article of claim 1, further comprising control data stored by the data storage medium; the control data comprising instructions that the processor can execute in using a string's characters to access the string's respective sequence of data units.

12. The article of claim 11 in which the first string's sequence further includes a medial subsequence of data units immediately preceding the first string's ending subsequence in the sequence, the medial subsequence having a first position within the string data; the ending subsequence having a second position within the string data; the instructions comprising:

a first set of instructions that the processor can execute to obtain second position data indicating the second position; the processor, in executing the first set of instructions, using first position data indicating the first position to access the medical subsequence; and a second set of instructions that the processor can execute to obtain the first string ending data; the processor, in executing the second set of instructions, using the second position data to access the ending subsequence.

13. The article of claim 12 in which the first string has an ending character with a respective character type; the ending subsequence further including character type information indicating the ending character's character type; the processor, in executing the first set of instructions, accessing the first string's ending subsequence and using character type data indicating a character type and the ending subsequence to obtain match data; the match data indicating whether the character type indicated by the character type data matches the character type indicated by the character type information.

14. The article of claim 1 in which the first string's sequence further includes a medial subsequence of data units preceding the first string's ending subsequence in the sequence; the medial subsequence occurring once in the first string's sequence of data units; the set of acceptable strings includes a second string that is in the first subset of categories; the second string's sequence of data units including the first string's ending subsequence so that the processor can access the first string's ending subsequence at the end of the second string's sequence and use it to obtain second string ending data indicating that the second string is one of the acceptable strings and indicating the first subset of categories; the medial subsequence occurring twice in the second string's sequence of data units.

15. A system comprising:

a processor;

memory; the processor being connected for accessing the memory; and string data stored by the memory; the string data comprising two or more data units, each of which can be accessed by the processor; the data units including, for each of a set of two or more acceptable strings of characters, a respective sequence of data units that the processor can access using character data indicating the string's characters;

the set of acceptable strings including a first string that is in a first subset of categories, each category in the first subset being one of a set of two or more categories; the first string's sequence of data units including a respective ending subsequence of data units that the processor can access at the end of the first string's sequence and use to obtain first string ending data indicating that the first string is one of the acceptable strings and indicating the first subset of categories; the first string's ending subsequence including:

acceptance information indicating that a string at the end of whose respective sequence the processor can access the ending subsequence is one of the set of acceptable strings; and category set information indicating the first subset of categories; the first subset of categories including at least one of the set of categories.

16. The system of claim 15, further comprising instructions stored by the memory that the processor can execute in using a string's characters to access the string's sequence of data units.

17. The system of claim 16 in which the first string's sequence further includes a medial subsequence of data units immediately preceding the first string's ending subsequence in the sequence, the medial subsequence having a first position within the string data; the ending subsequence having a second position within the string data; the instructions comprising:

a first set of instructions that the processor can execute to obtain second position data indicating the second position; the processor, in executing the first set of instructions, using first position data indicating the first position to access the medial subsequence; and a second set of instructions that the processor can execute to obtain the first string ending data; the processor, in executing the second set of instructions, using the second position data to access the ending subsequence.

18. A method of operating a system that includes:

a processor; memory; the processor being connected for accessing the memory; and string data stored by the memory; the string data comprising two or more data units, each of which can be accessed by the processor; the data units including, for each of a set of two or more acceptable strings of characters, a respective sequence of data units that the processor can access using character data indicating the string's characters;

the set of acceptable strings including a first string that is in a first subset of categories, each category in the first subset being one of a set of two or more categories; the first string's sequence of data units including a respective ending subsequence of data units that the processor can access at the end of the first string's sequence; the first string's ending subsequence including:

acceptance information indicating that a string at the end of whose respective sequence the processor can access the ending subsequence is one of the set of acceptable strings; and category set information indicating the first subset of categories; the first subset of categories including at least one of the set of categories;

the method comprising steps of:

operating the processor to access the first string's sequence using first string character data indicating the first string's characters; the step of operating the processor to access the first string's sequence comprising a substep of accessing the first string's ending subsequence; and operating the processor to use the first string's ending subsequence to obtain first string ending data indicating that the first string is one of the acceptable strings and indicating the first subset of categories.

19. The method of claim 18 in which the set of categories includes N categories, the first string ending data being an item of data that includes N bits, each indicating whether the first string is in a respective one of the categories.

20. The system of claim 15 in which the set of categories includes a category for words and a category for roman numerals.

21. A system comprising:

a processor;

memory; the processor being connected for accessing the memory; and string data stored by the memory; the string data comprising two or more data units, each of which can be accessed by the processor; the data units including, for each of a set of two or more acceptable strings of characters, a respective sequence of data units that the processor can access using character data indicating the string's characters;

the set of acceptable strings including first and second strings that are each in a first subset of categories, each category in the first subset being one of a set of two or more categories; the first string's sequence of data units including a respective ending subsequence of data units that the processor can access at the end of the first string's sequence and use to obtain first string ending data indicating that the first string is one of the acceptable strings and indicating the first subset of categories; the second string's sequence of data units including a respective ending subsequence of data units that the processor can access at the end of the second string's sequence and use to obtain second string ending data indicating that the second string is one of the acceptable strings and indicating the first subset of categories; the first and second strings' ending subsequences both including a shared ending subsequence; the shared ending subsequence including:

acceptance information indicating that a string at the end of whose respective sequence the processor can access the shared ending subsequence is one of the set of acceptable strings; and category set information indicating the first subset of categories; the first subset of categories including at least one of the set of categories.

22. A system comprising:

a processor;

memory; the processor being connected for accessing the memory; and string data stored by the memory; the string data comprising two or more data units, each of which can be accessed by the processor; the data units including, for each of a set of two or more acceptable strings of characters, a respective sequence of data units that the processor can access using character data indicating the string's characters;

the set of acceptable strings including a first string that is in a first subset of two or more categories, each category in the first subset being one of a set of two or more categories; the first string's sequence of data units including a respective ending subsequence of data units that the processor can access at the end of the first string's sequence and use to obtain first string ending data indicating that the first string is one of the acceptable strings and indicating the first subset of categories; the first string's ending subsequence including:

acceptance information indicating that a string at the end of whose respective sequence the processor can access the ending subsequence is one of the set of acceptable strings; and category set information indicating the first subset of categories.

23. A system comprising:

a processor;

memory; the processor being connected for accessing the memory;

instruction data stored by the memory, the instruction data indicating instructions the processor can execute; and string data stored by the memory; the string data comprising two or more data units, each of which can be accessed by the processor; the data units including, for each of a set of two or more acceptable strings of characters, a respective sequence of data units that the processor can access using character data indicating the string's characters;

the set of acceptable strings including a first string that is in a first subset of categories, each category in the first subset being one of a set of two or more categories; the first string's sequence of data units including a respective ending subsequence of data units that the processor can access at the end of the first string's sequence; the first string's ending subsequence including:

acceptance information indicating that a string at the end of whose respective sequence the processor can access the shared ending subsequence is one of the set of acceptable strings; and category set information indicating the first subset of categories; the first subset of categories including at least one of the set of categories;

the processor, in executing the instructions:

using the first string's characters to access the first string's sequence of data units; and accessing the first string's ending subsequence at the end of the first string's sequence of data units and using the first string's ending subsequence to obtain first string ending data; the first string ending data indicating that the first string is one of the acceptable strings and indicating the first subset of categories.

* * * * *